United States Patent
Calderon et al.

[15] 3,692,872
[45] Sept. 19, 1972

[54] PREPARATION OF GRAFT, BLOCK AND CROSSLINKED UNSATURATED POLYMERS AND COPOLYMERS BY OLEFIN METATHESIS

[72] Inventors: Nissim Calderon, Akron, Ohio 44313; Kenneth W. Scott, Cuyahoga Falls, Ohio 44224

[73] Assignee: The Goodyear Tire & Rubber Company, Akron, Ohio

[22] Filed: Dec. 4, 1969

[21] Appl. No.: 882,270

[52] U.S. Cl. ............ 260/878 R, 149/19, 260/41, 260/41.5, 260/88.2, 260/878 B, 260/879, 260/880, 260/880 B, 260/887
[51] Int. Cl. ............................................. C08f 15/04
[58] Field of Search ..................... 260/878, 878 B

[56] References Cited

UNITED STATES PATENTS

| | | |
|---|---|---|
| 3,435,096 | 3/1969 | Limbert et al. ......... 260/878 R |
| 3,557,253 | 1/1971 | Sugimoto et al. ....... 260/878 R |

*Primary Examiner*—Harry Wong, Jr.
*Attorney*—F. W. Brunner and J. Y. Clowney

[57] ABSTRACT

A method is disclosed for preparing graft, block and crosslinked unsaturated polymers and interpolymers by subjecting polymers to catalysts capable of inducing the olefin metathesis reaction.

6 Claims, No Drawings

PREPARATION OF GRAFT, BLOCK AND CROSSLINKED UNSATURATED POLYMERS AND COPOLYMERS BY OLEFIN METATHESIS

This invention relates to a new and novel method of preparing polymeric materials containing carbon-to-carbon olefinic double bonds and the products obtained thereof. In particular, the present invention is directed to a catalytic process where two unsaturated substances of which at least one of them is a high molecular weight polymeric material containing double bonds either along the main chain or as part of pendant side groups, are inter-reacted by means of an olefin metathesis reaction leading to the formation of new and useful polymeric materials.

The olefin metathesis reaction is a unique bond-reorganization process, whereby materials possessing carbon-to-carbon double bonds, undergo a redistribution of constituents as depicted in the following equation:

$$2R_1CH=CHR_2 \rightleftharpoons R_1CH=CHR_1 + R_2CH=CHR_2$$

The olefin metathesis reaction, being an equilibrium process, facilitates: (1) obtaining the olefins $R_1CH=CHR_1$ and $R_2CH=CHR_2$ starting from $R_1CH=CHR_2$; or alternatively, (2) obtaining the olefin $R_1CH=CHR_2$ by starting from a mixture of the olefins $R_1CH=CHR_1$ and $R_2CH=CHR_2$.

If the process described in the previous paragraph is applied to a mixture composed of two polymers, both having carbon-to-carbon unsaturation in the backbone of their polymeric main chains, e.g., 1,4-polybutadiene and 1,4-polyisoprene, the olefin metathesis reaction will lead to the formation of copolymers:

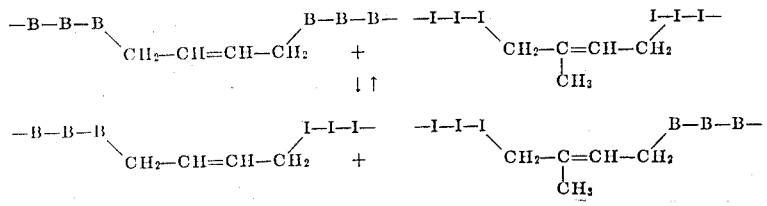

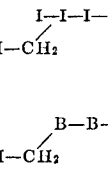

The sequence length distribution will depend on the extent to which the metathesis reaction is utilized. At the extreme, a random copolymer of butadiene and isoprene will be obtained. If the metathesis reaction is utilized to exert only a slight degree of bond reorganization on the mixture of the two polymers, the product will be comprised of mainly block copolymers of isoprene and butadiene. These products are useful since by this process one has considerable control over the sequence distribution of interpolymers of isoprene and butadiene which are noted for their good rubbery properties.

When a polymer possessing carbon-to-carbon unsaturation sites in its pendant side groups, e.g., ethylene-propylene-diene terpolymer (EPDM), is exposed to the olefin metathesis reaction in the presence of a second unsaturated polymer, for example, such as 1,4-polybutadiene, a product comprised of a graft copolymer of 1,4-polybutadiene on EPDM will be formed:

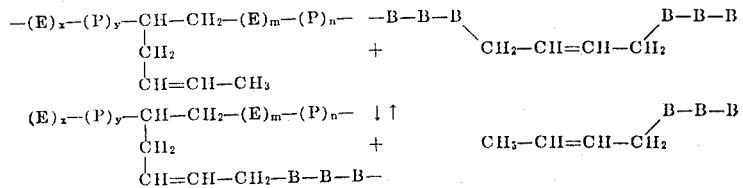

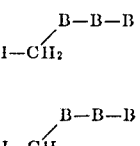

The E, P and B represent ethylene, propylene and butadiene polymeric repeat units respectively. Typically, suitable diene termonomers in the EPDM include 1,4-hexadiene, ethylidene norbornene, vinylnorbornene and other non-conjugated dienes.

The graft copolymer of 1,4-polybutadiene on EPDM can be made even more efficiently if the diene termonomer of the EPDM is an alicyclic compound, such as for example, dicyclopentadiene or 1,5-cyclooctadiene, then the above reaction becomes in the latter case:

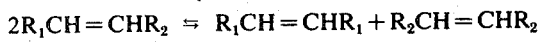

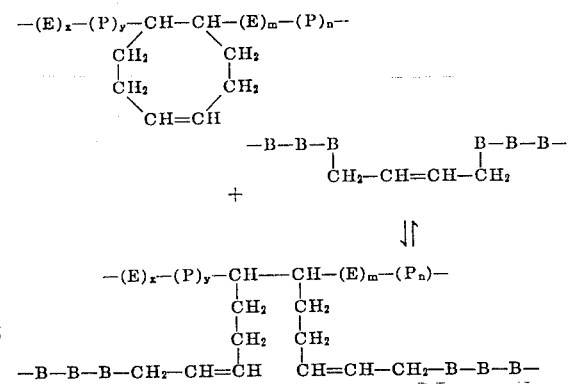

These grafting reactions are sometimes accompanied by gel formation which may be minimized by incorporating suitable amounts of acyclic unsaturated compounds as described in application Ser. No. 882,269, pending filed on even date herewith.

The catalysts employed in the olefin metathesis process which will be described extensively elsewhere in the present application, are also capable of promoting ring-opening polymerization of cycloolefins:

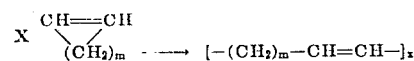

The products obtained as a result of the ring-opening polymerization of cycloolefinic monomers are polymers possessing carbon-to-carbon double bonds along the backbone of their main polymer chains. Thus, it can be seen that by reacting at least one cycloolefinic monomer with at least one of the polymeric species in the processes described above, a "one step" process is obtained wherein there occurs a simultaneous ring-opening polymerization of a cycloolefinic monomer and the grafting of the resulting polymer onto a second "backbone" polymer such as EPDM. Likewise, the polymeric species such as EPDM can be grafted onto the polymer resulting from the ring-opening polymerization of the cycloolefinic monomer. Polyoctenamer [IUPAC nomenclature, J. Polymer Sci., 8, 257 (1952)] can be grafted on EPDM in a manner similar to the above described grafting of 1,4-polybutadiene onto EPDM. Alternatively, a mixture of cyclooctene and EPDM, treated with a catalyst capable of inducing both olefin metathesis and ring-opening polymerization of cycloolefins will also yield a graft polymer of polyoctenamer and EPDM. Such a product has good aging stability like EPDM but yet is faster and better curing like diene rubbers.

Similarly by reacting a backbone unsaturated polymer, e.g., polyoctenamer, with a polymer having both pendant group and backbone unsaturation, e.g., a polybutadiene with mixed 1,4- and 1,2-structures, one may obtain a product which is a combination of graft and block copolymer structures.

Another application of the olefin metathesis reaction regarding unsaturated polymers is for the purpose of branching and crosslinking. If an unsaturated polymer, such as 1,4-polybutadiene or polyoctenamer, is exposed to an olefin metathesis catalyst in the presence of certain multicyclic cycloolefins, containing at least two unsaturated rings, polymerizable by the ring-opening process, branching and crosslinking of the unsaturated polymer will occur. In general, suitable multicyclic cyclomultiolefins will be comprised of two, three, four or more ring-openable cyclic structures each characterized by an olefinic unsaturation site and the number of carbon atoms occurring in linear sequence in an individual cyclic structure being four, five, eight, nine or more. Examples of typical multi-functional cyclic cross-linking agents are represented in the formulas I through IV.

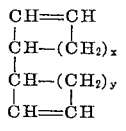  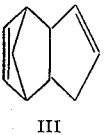 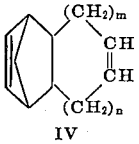
   I       II      III      IV $x = 1, 2, 4, 5$ or more.
$y = 1, 2, 4, 5$ or more.
$n + m = 0, 1, 3, 4, 5$ or more.

Branching and crosslinking is illustrated for the special case of 1,4-polybutadiene and a compound defined by IV where m and n both equal 2, may be depicted as follows:

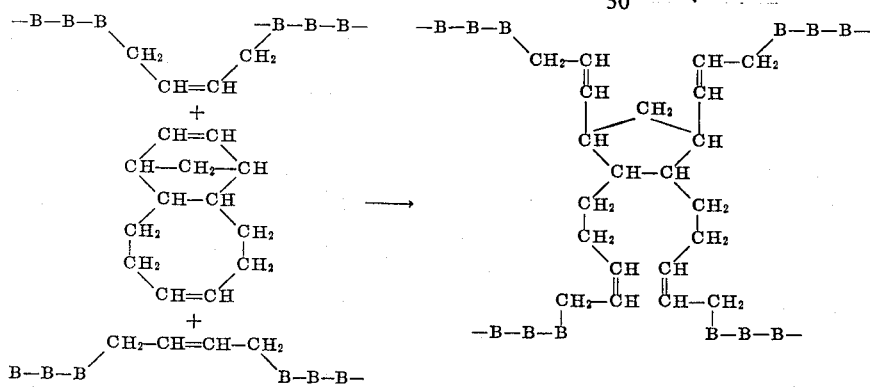

When this process is carried out extensively, so that on the average each weight average chain of 1,4-polybutadiene participates in one crosslinking step as described above, the polymer will begin to convert into an insoluble gel with the introduction of further crosslinking. Such crosslinking converts a raw elastomer into a cured vulcanizate with improved properties.

If the polymer possesses sufficient unsaturation in pendant groups then the use of an olefin metathesis catalyst may induce crosslinking even in the absence of crosslinking multicyclic cycloolefins. Additionally, acyclic olefins may be used to diminish the amount of effective crosslinking.

It is also possible to replace the unsaturated polymer here by a ring-openable cycloolefin so that the ring opening polymerization of a cycloolefin in the presence of a multicyclic cyclomultiolefin directly yields a crosslinked network with useful physical properties. By combining polymerization and crosslinking in one step this process is ideally suited for making molded products, potting compounds, solid rocket propellants and other products usually made from liquid rubbers.

Polymers that can be employed according to the present invention in the various processes, involving the olefin metathesis reaction, for the purpose of preparing: (1) copolymers and block copolymers; (2) graft copolymers; and (3) crosslinking for unsaturated polymers, as have been described heretofore, must possess some carbon-to-carbon double bond unsaturation. Examples are polymers such as polybutadiene, polyisoprene and polyalkenamers corresponding to the formula: $[\ -(CH_2)_m-CH=CH-\ ]$. A more general formula of the structural unit occurring in all polymers which can be employed in the present invention is the following one which is free of any non-aromatic conjugation:

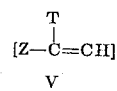

where, T is either hydrogen or a substituent group of the structure $D-CH_2-$, wherein D is a member selected from the group consisting of alkyl, aryl, aralkyl, alkaryl, alkenyl, cycloalkyl, cycloalkenyl, bicycloalkyl, bicycloalkenyl radicals and hydrogen; and Z represents hydrogen or a fragment having at least one or more carbons and any of the said Z carbon atoms may be:

a. interconnected by either single or double bonds provided that no two double bonds are aliphatically conjugated;

b. any carbon atoms in Z may be substituted by one or more substituent members of the group alkyl, aryl, alkenyl, aralkyl, alkenyl, cycloalkyl, cycloalkenyl, bicycloalkyl, and bicycloalkenyl; and
c. any of the carbon atoms in Z may be constituents of aromatic, alicyclic and chlorinated alicyclic rings.

When V occurs in the polymer backbone, Z is multifunctional and preferably difunctional. When Z is in a pendent group of a polymer, it is preferably monofunctional, such as, hydrogen, alkyl or aryl.

Structural unit V represents the unsaturation sites present in either the backbone or pendent groups of a polymer. Structural unit V may be a polymeric repeat unit of a homopolymer, copolymer or block polymer and as such constitutes unsaturation sites occurring within the backbone of the polymer main chain. Examples of such polymers are 1,4-polybutadiene, polyalkenamers, 1,4-polyisoprene, butyl rubber, SBR (copolymer of styrene and butadiene), and a styrene-butadiene-styrene triblock copolymer. Structural unit V may also occur in a pendent group attached to the backbone of the polymer main chain of a homopolymer, copolymer or graft polymer. Examples of such polymers are 1,2-polybutadiene, 3,4-polyisoprene, 1,2-polypiperylene, EPDM (terpolymer of ethylene, propylene and a non-conjugated diene), and polybutadiene grafted onto a backbone of polystyrene. Structural unit V may be present both in the backbone and the pendent groups of homopolymers, copolymers and other interpolymers. Examples of such polymers are mixed 1,2-, 1,4-polybutadiene, SBR with mixed 1.5, 1,4- combined butadiene units and polybutadiene grafted onto polyisoprene.

Cycloolefins which may undergo ring-opening polymerizations by olefin metathesis catalysts and are thus useful for the (1) "one step" grafting on EPDM, and (2) polymerization and crosslinking in one step, include compounds selected from the group consisting of:

A. alicyclic compounds corresponding to the formula:

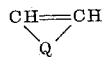

wherein:
1. Q is a fragment which comprises a sequence of at least six carbon atoms situated in linear succession between the methylidene carbons which constitute the double bond;
2. the carbon atoms in the linear succession of Q may be interconnected by both carbon-carbon single bonds and carbon-carbon double bonds;
3. any of the carbon atoms in the linear succession of Q may be substituted by at least one member from the group of alkyl, aryl, alkenyl, aralkyl, alkaryl, cycloalkyl, cycloalkenyl, bicycloalkyl and bicycloalkenyl radicals;
4. any of said carbon atoms in the linear succession of Q may be constituents of aromatic rings, alicyclic rings and chlorinated alicyclic rings; and
5. said alicyclic unsaturated hydrocarbon contains no non-aromatic conjugated double bonds; and B. alicyclic compounds corresponding to the formula:

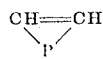

wherein:
1. P is a fragment which comprises a sequence of at least two and not more than three carbon atoms situated in linear succession between the methylidene carbons which constitute the double bond;
2. the carbon atoms in linear succession of P are connected by carbon to carbon single bonds;
3. any of the carbons in the linear succession of P may be substituted by at least one substituent member from the group of alkyl, aryl, alkenyl, aralkyl, alkaryl, cycloalkyl, cycloalkenyl, bicycloalkyl and bicycloalkenyl radicals;
4. any of said carbons in linear succession of P may be constituents of aromatic rings, alicyclic rings, and chlorinated alicyclic rings, and
5. said alicyclic unsaturated hydrocarbon compound contains no non-aromatic conjugated double bonds.

Thus, it can be seen from the foregoing discussion that the process of this invention is one of preparing new and novel polymeric materials. It is also a process for preparing graft interpolymers. It is also a process for the preparation of block interpolymers and it is also a process of producing branching or crosslinking in an unsaturated polymeric material.

Thus, the invention comprises a chemical process involving exposure of two or more dissimilar polymeric substances that are characterized by being free of any non-aromatic conjugation and comprised of structural units of the general formula (V):

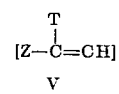

wherein:
A. T is
1. hydrogen; or
2. a substituent corresponding to the formula D—CH$_2$—, where D is any member of the group: alkyl, aryl, aralkyl, alkaryl, alkenyl, cycloalkyl, cycloalkenyl, bicycloalkyl, bicycloalkenyl, and hydrogen; and
B. Z represents hydrogen or a structure having at least one carbon atom and any of the said Z carbons may be:
1. interconnected by single or double bonds;
2. substituted by one or more members of the group alkyl, aryl, aralkyl, alkaryl, alkenyl, cycloalkyl, bicycloalkyl, cycloalkenyl and bicycloalkenyl;
3. constituents of aromatic, alicyclic or chlorinated alicyclic rings;

to a catalyst capable of inducing the olefin metathesis reaction of the double bonds of the repeat units of (V), leading to products which are interpolymers of the starting reactant polymeric substances.

The various catalyst systems that have been found to be effective in promoting the olefin metathesis reaction and the ring-opening polymerization of unsaturated alicyclic monomers are also effective catalyst systems for promoting the processes of the present invention. These catalyst systems may be either heterogeneous or homogeneous with the former having the advantage of being more readily removable from the reaction products while the latter is more efficient from the standpoint of catalytic activity. Catalyst systems which are operable according to the present invention are those systems which are capable of promoting the ring opening polymerization of cyclooctene to form polyoctenamer and/or capable of promoting the olefin metathesis reaction of 2-pentene leading to the formation of 2-butene and 3-hexene at temperatures lower than about 100° C.

One class of homogeneous catalyst systems employed in the practice of this invention is a system comprising: (A) at least one organometallic compound wherein the metal is selected from the group consisting of Ia, IIa, IIb and IIIa groups of the Periodic Table of Elements, (B) at least one metal derivative wherein the metal is selected from the group consisting of molybdenum and tungsten and (C) at least one material selected from a group consisting of oxygen and compounds of the general formula R—Y—H wherein Y is selected from the group of oxygen and sulfur and wherein R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8) when Y is O, R is alkoxy, arylalkoxy and alkaryloxy and radicals of (2) through (6) wherein at least one hydrogen is substituted by a group selected from hydroxyl (OH) and thiol (SH). The Periodic Table of Elements referred to may be found in the Handbook of Chemistry and Physics, 44th Edition, April 1962 reprint, published by the Chemical Rubber Publication Company, Cleveland, Ohio, U. S. A., p. 448.

Representative examples of metals from which the organometallic compound, the first or (A) component of the catalyst system of this invention, can be derived are lithium, sodium, potassium, rubidium, cesium, beryllium, magnesium, calcium, strontium, barium, zinc, cadmium, aluminum, gallium, indium, and thallium. The preferred organometallic compounds are compounds of lithium, sodium, magnesium, aluminum, zinc and cadmium with aluminum being most preferred.

Representative examples of organometallic compounds useful as the first or (A) catalyst component of this invention are aluminum compounds having at least one aluminum-to-carbon bond. Representative of such compounds are trialkylaluminums such as trimethylaluminum, triethylaluminum, tri-n-propylaluminum, tri-n-butylaluminum, triisopropylaluminum, triisobutylaluminum, trihexylaluminum, trioctylaluminum, and the like; triarylaluminums such as tritolylaluminum, tribenzylaluminum, triphenylaluminum, and the like; dialkylaluminum halides such as diethylaluminum chloride, di-n-propylaluminum chloride, diisobutylaluminum chloride, diethylaluminum bromide, diethylaluminum iodide and diethylaluminum fluoride and the like; mixtures of dialkylaluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide and the like; dialkylaluminum hydrides such as diethylaluminum hydride, di-n-propylaluminum hydride, diisobutylaluminum hydride, and the like; arylaluminum hydrides and dihydrides such as diphenylaluminum hydride and phenylaluminum dihydride, the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide, and the like. Other organometallic compounds are also useful in the practice of this invention. Representative of such organo-metallic compounds are organoalkali metal compounds such as alkyllithium compounds as ethyllithium, n-butyllithium, t-butyllithium and the like; lithium-aluminum-tetraalkyls such as lithium-aluminum tetrabutyl, lithium-aluminum-tetraethyl, and the like; alkali metal alkyls and aryls such as amylsodium, butylpotassium, phenylpotassium, phenylsodium, phenyllithium, butyllithium and the like; magnesium alkyls and aryls such as diphenylmagnesium, diethylmagnesium, ethylmagnesium chloride, phenylmagnesium chloride, butylmagnesium bromide, and the like; calcium, strontium and barium organo compounds such as barium alkyls and aryls of Groups IIb metals such as diethylzinc, diphenylzinc, ethylzinc chloride, diethylcadmium, dibutylcadmium, and the like; Grignard agents such as phenylmagnesium bromide may also be employed. Mixtures of these compounds may be employed as the first or (A) catalyst component in the catalyst of this invention. It is usually preferred to employ aluminum compounds such as trialkylaluminums, dialkylaluminum halides, alkylaluminum dihalides and aluminumsesquihalides.

The metal derivatives employed in the catalyst of this invention as the second or (B) catalyst component are selected from the derivatives of molybdenum and tungsten. Representatives of such derivatives include halides such as chlorides, bromides, iodides and fluorides, which include compounds such as molybdenum pentachloride, tungsten hexachloride, molybdenum pentabromide, tungsten hexabromide, molybdenum pentaiodide, molybdenum pentafluoride, molybdenum hexafluoride and tungsten hexafluoride. Other representative salts are those of acetylacetonates, sulphates, phosphates, nitrates and the like which include compounds such as molybdenum phosphate, tungsten phosphate, molybdenum nitrate, tungsten nitrate, molybdenum acetylacetonate, tungsten acetylacetonate, molybdenum sulphate, and tungsten sulphate. Mixtures of these salts may also be employed. Of these, it is usually preferred to employ tungsten halides and molybdenum halides, representative of which are tungsten hexachloride and molybdenum pentachloride.

The third component or (C) component of the catalyst system of this invention is selected from the group consisting of oxygen and compounds which respond to the formula R—Y—H wherein Y is selected from the group consisting of oxygen and sulfur and R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8) when Y is O, R is alkoxy, arylalkoxy and alkaryloxy and (9) radicals of (2) through (6) wherein at least one hydrogen of R is substituted by at least one hydroxyl (OH) or thiol (SH) group.

Thus, the formula R—Y—H above defines a number of types of compounds. It defines water (HOH), hydrogen sulfide (HSH), both saturated and unsaturated alcohols (ROH), mercaptans (RSH), hydroperoxides (ROOH), hydrodisulfides (RSSH), polyalcohols (HOROH), polymercaptans (HSRSH), and hydroxy mercaptans (HSROH) or thioalcohols (HORSH). Representative examples of the materials corresponding to the formula above are alcohols representative of which are methanol, ethanol, isopropanol, tertiarybutyl alcohol, amyl alcohol, benzyl alcohol, allyl alcohol, 1,1-dimethyl benzyl alcohol, phenol, tertiarybutyl catechol, alpha and beta naphthyl alcohol; mercaptans such as methyl, ethyl, propyl, isopropyl, butyl, amyl and similar mercaptans, allyl mercaptan, thiophenol, 4-methylthiophenol, 4-mercaptophenyl; the hydroperoxides such as cumyl hydroperoxide, tertiarybutyl hydroperoxide; the hydrodisulfides such as cumyl hydrodisulfide, s-butyl hydrodisulfide; the polyalcohols such as ethylene glycol, glycerol, and similar polyglycols; catechol, resorcinol, hydroquinone, pyrogallol; the polymercaptans such as 1,3-propane dithiol, 1,4-dithiobenzene; the hydroxymercaptans or thioalcohols such as ethane-2-ol-1-thiol, 1-hydroxy-4-thiobenzene.

One of the unusual and distinguishing features of these catalyst systems is that the compound of the formula R-Y-H, wherein R and Y have been previously defined, when employed in fairly substantial amounts reduces drastically the activity of the olefin metathesis reaction by which the processes of this invention occur. These catalyst systems have also been found to exhibit unexpected high activity when compounds of the R—Y—H type are employed in relatively small amounts and added according to the teachings set forth in the present specification and examples. Since the instant invention contemplates the use of organometallic compounds in combination with transition metal salts and various oxygen and sulfur-containing compounds, and since various factors or considerations will influence the optimum range of the three catalyst components in relation to each other, the molar ratios of the three components which optimize the reaction conditions cannot be readily set forth. However, by following the teachings found in this application, those skilled in the art can readily determine the optimum molar ratio of the three catalyst components to each other. Obviously, if one employs the oxygen or sulfur-containing compound or oxygen or as is designated above, component (C) in relatively large amounts, the activity of the catalyst will be reduced considerably or even destroyed.

It has been found that good results are obtained in the practice of this invention when the molar relationship between the three catalyst components, (A), (B) and (C) as previously defined, are within a molar ratio of (B)/(C) ranging from about 0.3/1 to at least about 20/1 and the molar ratio of (A)/(B) is within the range of about 0.5/1 to at least 15/1. More preferred ratios are (B)/(C) of 0.5/1 to 5/1 and (A)/(B) of 0.5/1 to 8/1. Still more preferred ratios were (B)/(C) of 1/1 to 2/1 and (A)/(B) of 0.75/1 to 5/1.

The catalyst systems set forth above and useful in the practice of this invention are prepared by mixing the components by known techniques. Thus, the catalyst systems may be prepared by "preformed" or "in situ" techniques. By the "preformed" method the catalyst components are mixed together prior to exposure of any of the catalyst components to the unsaturated reactants to be used in the process of this invention. In the "in situ" method the catalyst components are added separately to the unsaturated reactants to be used in the process of this invention. The catalyst components may be mixed either as pure compounds or as suspensions or solutions in liquids which do not adversely affect the catalyst activity of the olefin metathesis reaction. Representative of such liquids are saturated hydrocarbons such as hexane, pentane and the like, or aromatics such as benzene, toluene and the like.

While the presence of the unsaturated reactants is not essential during the formation of active catalyst by a mixing of components (A), (B) and (C) and this fact facilitates the use of "preformed" catalysts, it has been found that freshly preformed catalysts are generally more active than catalysts which have been allowed to age before use.

The order of addition of the three catalyst components to each other is of interest in the practice of this invention. There are various methods in which the three catalyst components can be brought into contact with the reactants or reactants/solvent mixture. The following is a numerical listing of these various methods in which A, B and C stand for the catalyst components as previously defined:

1. Simultaneous addition of A, B and C;
2. C followed by A and B which were previously preformed;
3. A and B preformed followed by C;
4. A followed by B and C which were preformed;
5. B and C preformed followed by A;
6. B followed by A and C which were preformed;
7. A and C preformed followed by B;
8. A followed by B followed by C;
9. B followed by A followed by C;
10. C followed by B followed by A;
11. C followed by A followed by B;
12. B followed by C followed by A;
13. A followed by C followed by B;
14. Preformed A, B and C which was prepared by adding A to B and C preformed;
15. Preformed A, B and C which was prepared by adding B to A and C preformed; and
16. Preformed A, B and C which was prepared by adding C to A and B preformed.

The amount of catalyst employed in the reactions of this invention may be varied over wide concentrations and has not been found to be critical. Of course, a catalytic amount of the catalyst must be employed. The optimum amount of catalyst depends upon a number of factors such as temperature, purity of reactants, reaction times desired, and the like. The processes of this invention can be conducted wherein the amount of catalyst employed is about 0.01 part by weight of component (B) per 100 parts by weight of unsaturated reactants employed, with components (A) and (C) adjusted to yield a desirable molar ratio of (A)/(B)/(C). Those skilled in the art will readily be able to determine the optimum catalytic ranges.

A second class of catalyst systems effective in the present invention consists of a two-component catalyst system. This catalyst system comprises (A) at least one organoaluminum halide selected from the group consisting of RAlX$_2$ and R$_2$AlX wherein X is a halide such as chloride, bromide, iodide, and fluoride, and R is selected from the group of alkyl, aryl, arylalkyl and alkaryl, and (B) at least one tungsten derivative.

Thus, representative examples of the first or (A) catalyst component are aluminum compounds having at least one aluminum-to-carbon bond. Representative of such compounds are dialkylaluminum halides such as diethylaluminum chloride, di-n-propylaluminum chloride, diisobutylaluminum chloride, diethylaluminum bromide, diethylaluminum iodide and diethylaluminum fluoride, and the like; mixtures of dialkylaluminum halides and alkylaluminum dihalides such as ethylaluminum sesquichloride and bromides may also be employed; alkylaluminum dihalides such as ethylaluminum dichloride, ethylaluminum dibromide, propylaluminum dichloride, isobutylaluminum dichloride, ethylaluminum diiodide, and the like; the arylaluminum halides such as phenylaluminum dibromide, tolylaluminum dibromide, benzylaluminum dibromide, phenylaluminum diiodide, tolylaluminum diiodide, benzylaluminum diiodide, diphenylaluminum chloride, ditolylaluminum chloride, dibenzylaluminum bromide, and the like.

Representative of the tungsten salts employed as the second or (B) catalyst component include halides such as chlorides, bromides, iodides, and fluorides, which include compounds such as tungsten hexachloride, tungsten hexabromide, tungsten hexaiodide, and tungsten hexafluoride. Other representative salts are those of acetylacetonates, sulphates, phosphates, nitrates, and the like which include compounds such as tungsten phosphate, tungsten nitrate, tungsten acetylacetonate and tungsten sulphate. Mixtures of these salts may also be employed. Of these, it is usually preferred to employ tungsten halides such as tungsten hexachloride.

The molar relationship between the two catalyst components (A) and (B) as previously defined in this catalyst system are within a molar ratio of (A)/(B) of about 0.5/1 to about 15/1 with a more preferred molar ratio of (A)/(B) of about 0.5/1 to about 8/1 and a still more preferred molar ratio of (A)/(B) of about 0.75/1 to about 5/1. These catalysts can be prepared by "in situ" or "preformed" techniques. No particular order of addition is required in preparing active catalysts from this species. These catalyst components may be reacted together as pure compounds or in solutions or suspensions in inert liquids. Representative of such liquids are saturated hydrocarbons such as pentane, hexane and the like or aromatic hydrocarbons such as benzene, toluene and the like.

The amount of catalyst employed in the reactions of the present invention, when this two-component catalyst system is employed, has not been found to be critical and may range over wide concentrations. Of course, a catalytic amount of the catalyst must be employed but the optimum amount depends upon a number of factors such as temperature employed, the particular reactants employed, the purity of the reactants, the reaction times desired, and the like. Polymerization reactions can be conducted wherein the amount of catalyst is about 0.01 part by weight of the (B) component per 100 parts by weight of the monomer employed with the proper mole ratio of (A)/(B) being adjusted.

A third class of catalyst systems effective in promoting the processes of the present invention consists of (A) an aluminum halide, AlX$_3$, and (B) a salt of the transition metal tungsten, whereby the tungsten is at any oxidation status within the IV to VI range.

Representative examples of component (A) are: aluminum chloride, aluminum bromide, aluminum iodide and aluminum fluoride. The preferred halides are the chloride and bromide of aluminum. Examples of component (B) are: tungsten, tetra-, penta- and hexachloride, tungsten tetra- and pentabromide, tungsten tetra- and pentaiodide, tungsten hexafluoride and the tungsten oxychlorides. This two component catalyst system is unique as it does not require the employement of any organometallic catalyst component. However, this system can be further modified by an organometallic reagent. (In certain reactions of unsaturated alicyclic compounds, advantages such as suppression of gel formation, and an increase in polymerization rates at lower catalyst levels can be achieved by the modification of the last two-component catalyst system by an optional third organometallic reagent). Examples of such optional organometallic reagents are organoalkali metal compounds such as alkyl and aryllithium; alkyl- and arylsodium; organomagnesium compounds such as dialkyl- or diarylmagnesium; organomagnesium halides; organometallic derivatives of calcium, strontium and barium; alkyls and aryls of Groups IIb metals such as dialkyl- and diarylzinc and the like.

Other classes of catalysts which are effective in promoting the polymerizations of this invention are those disclosed in U.S. Pat. applications Ser. Nos. 755,374; 755,375; 755,376 and 795,693.

The operating conditions which are employed in the processes of this invention may vary. The reactions can be conveniently carried out in a liquid form or even only a swollen system. Thus, when a polymeric material is employed in any particular reaction, it is possible to carry out the reaction in solution. Solvents which can be used when solution conditions are employed include any inert solvents that preferably dissolve or swell the polymers employed. Convenient solvents are aliphatic, aromatic or cycloaliphatic hydrocarbons which do not themselves inhibit or interfere with the metathesis reaction, such as pentane, hexane, benzene, toluene, cyclohexane and the like. When the reactants are liquid, the reaction can be conducted in bulk.

Since the present invention teaches the preparation of crosslinked polymers in a one-step process starting with a cycloolefin monomer in the presence of multifunctional crosslinking polycyclicpolyene comonomers, there is within the scope of this invention a process whereby a mixture containing (a) polymerizable unsaturated alicyclic monomer; (b) a multifunctional cross-linking comonomer; (c) a filler; (d) antioxidant; and (e) extending oil, is exposed to a suitable olefin metathesis catalyst obtaining a mixture which can be polymerized in a mold to a cross-linked finished rubber product, all in one step. When the filler used is a reinforcing carbon black or iron oxide pigment, the resulting product is useful in many mechanical rubber goods applications. When the filler is capable of an exothermic reaction, e.g., an oxidizing mixture, such as ammonium perchlorate and powdered aluminum, the product is a solid rocket propellant.

The metathesis processes involved in this invention can be carried out over a wide range of temperatures. It is convenient to carry out the process at room temperature.

The invention is further illustrated by reference to the following examples which are intended to be representative rather than restrictive of the scope of this invention.

EXAMPLE I

A solution of 100 ml cyclooctene in 1,400 ml benzene was polymerized at 30° C. using 4.0 ml of $WCl_6 \cdot C_2 5OH$ (0.05M) and 4.0 ml of ethylaluminum dichloride (EADC) (0.2 M) as the catalyst. In a separate polymerization reaction, 30 ml cyclododecene was polymerized in 300 ml benzene using 2.0 ml $WCl_6 \cdot C_2 5OH$ (0.05 M) and 2.0 ml of EADC (0.2 M). After about 30 minutes, during which both polymerizations reached high conversions, the viscous cements of the cyclooctene and cyclododecene polymerizations were mixed. An additional 4.0 ml $WCl_6 \cdot C_2H_5OH$ (0.05 M) and 4.0 ml EADC (0.2 M) solutions were added, allowing both polymers to inter-react for about 5 minutes before terminating with methanol containing di-tert.-butyl-p-cresol antioxidant. After drying and isolation of the product, a final yield of 81.0 gms of a copolymer of cyclooctene and cyclododecene was obtained. The product had physical characteristics suggesting that it was substantially a block copolymer of the reacting polymers.

EXAMPLE II

An 18 gm EPDM sample (Nordel 1070 - DuPont's trade name) was dissolved in 450 ml dry benzene, containing 20 ml of 1,5-cyclooctadiene (COD), and purged with nitrogen for 10 minutes. A solution of 4.0 ml $WCl_6 \cdot C_2H_5OH$ (0.05 M) was added followed by 4.0 ml of EADC (0.2 M). After about 5 minutes the cement thickened and converted to a crosslinked gel. The mixture was treated with methanol containing di-tert.-butyl-p-cresol and tray-dried. A yield of 31 grams of graft copolymer of polybutadiene (polybutenamer) on EPDM was obtained.

EXAMPLE III

Two EPDM (Nordel 1070) samples (90 gms each) were separately dissolved in 3.5 liters of benzene, each containing 10 ml of 3-heptene. One bottle was charged with 22.5 gms and the other with 45.0 gms of 1,5-cyclooctadiene. Polymerization and grafting were promoted with the $WCl_6 \cdot C_2H_5OH$ and EADC catalyst combinations, in a similar manner as in Example II. The products of reaction did not gel in these experiments and the graft copolymers were found to be soluble. NMR analyses of the polymers indicated a level of unsaturation corresponding to 20 weight percent polybutadiene grafted on the EPDM.

EXAMPLE IV

Into a 20 gm sample of purified cyclooctene there was added 0.06 gms of cyclooctadiene-cyclopentadiene dimer (COD·CPD) having the structural formula:

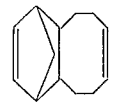

The mixture was thoroughly purged by nitrogen, then treated by 1 ml of $WCl_6$ solution in benzene (0.05 M), followed by 1 ml EADC solution (0.2 M). The mixture turned viscous within a matter of a few seconds. After 30 minutes the polymerizing mass became a rubbery solid. The reaction product was found to be 98.2 percent insoluble in benzene, and the insoluble gel had a swelling ratio in benzene of 5.2. (Swelling ratio = Wt. of swollen rubber/Wt. of dried rubber).

EXAMPLE V

A solution of 40.0 gms of EPDM (Nordel 1070) in 1 liter of dried benzene is mixed with 200 ml solution containing 10 gms of 1,4-polybutadiene. After mixing the cements and purging with nitrogen, 20 ml $WCl_6 \cdot C_2H_5OH$ (0.05 M) and 20 ml of EADC (0.2 M) solutions are added. An immediate gelation occurs and the loose gel thus obtained eventually encompasses virtually all the polymeric material in the reaction mixture. After termination and drying the lightly gelled polymer is converted into soluble polymer by milling.

EXAMPLE VI

Into a solution of 8 gms of polybutadiene (polybutenamer) in 100 ml benzene there is added 8 gms of cyclooctene monomer. The mixture is thoroughly shaken and purged with dry nitrogen. A catalyst, comprising 1 ml $WCl_6 \cdot C_2H_5OH$ (0.05 M) and 1 ml EADC (0.2 M) solutions in benzene, is added to the mixture. The reaction is allowed to proceed at room temperature for about 30 minutes, whereupon an approximately 50/50 poly(butenamer-co-octenamer) is obtained. The product is isolated after termination by tray-drying. It appeared to be a random copolymer of butenamer and octenamer units.

EXAMPLE VII

A. Preparation of Polymerizing Dispersions

Cyclooctene, freshly distilled from sodium, was mixed with an extender oil (Shellflex 310), the antioxidant di-tert.-butyl-p-cresol, and carbon black filler in a clean, dry, balljar under nitrogen for 16 hours. Prior to use, the carbon black was degassed by warming at 60°-80 C. under vacuum for a period of four hours.

B. Polymerization Procedure

Into each of the 8 oz. bottles, fitted with self-sealing caps, 40 ml premix (prepared as described in A) was introduced. Varied amounts of COD·CPD (see Example VI) were added to the bottles prior to purging with nitrogen. The capped bottles were injected with the catalyst components ($WCl_6 \cdot C_2H_5OH$ and EADC) which were dissolved in high boiling oils. The bottles were placed on rotating rollers for 30 minutes causing the polymerization product to form sheets of crosslinked, carbon black filled, oil extended polyoctenamer rubber on the walls of the bottles. The resulting sheets were placed in a vacuum oven for drying.

Dumbbells were cut out of the rubber sheets and tensile strength measurements were carried out. The relevant data of these experiments are included in Table 1.

TABLE 1

| Exp. No. | Conversion (%)* | COD-CPD** (Phr) | Modulus 300%, psi | Tensile (psi) | Elongation (%) |
| --- | --- | --- | --- | --- | --- |
| 1 | 95.2 | 1.5 | 470 | 880 | 450 |
| 2 | 95.7 | 1.5 | 360 | 1400 | 770 |
| 3 | 93.9 | 2.0 | 180 | 475 | 620 |
| 4 | 94.1 | 2.4 | 335 | 920 | 580 |
| 5 | 95.0 | 2.4 | – | 155 | 290 |

*Catalyst: 1.4 ml 0.5 M EADC; 2.0 ml 0.05 M $WCl_6 \cdot C_2H_5OH$.
**Premix contained 10 phm (parts per hundred monomer) FEF carbon black, 25 phm Shellflex 310 oil, and 1 phm ditert.-butyl-p-cresol antioxidant.

While certain representative embodiments and details have been shown for the purpose of illustrating the invention, it will be apparent to those skilled in this art that various changes and modifications may be made therein without departing from the spirit or scope of the invention.

What is claimed is:

1. A process wherein a mixture comprised of
(A) at least one polymeric substance, free of non-aromatic conjugation and comprised of structural units of the general formula (V):

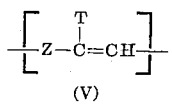

(V)

wherein:
1. T is
   a. hydrogen; or
   b. a substituent corresponding to the formula D—CH$_2$—, where D is any member of the group: alkyl, aryl, aralkyl, alkaryl, alkenyl, cycloalkyl, cycloalkenyl, bicycloalkyl, bicycloalkenyl and hydrogen; and
2. Z represents hydrogen or a structure having at least one carbon atom and any of the said Z carbons may be
   a. interconnected by single or double bonds;
   b. substituted by one or more members of the group: alkyl, aryl, aralkyl, alkaryl, alkenyl, cycloalkyl, bicycloalkyl, cycloalkenyl and bicycloalkenyl; and
   c. constituents of aromatic, alicyclic or chlorinated alicyclic rings;

B. at least one alicyclic unsaturated hydrocarbon selected from the group consisting of:
1. alicyclic compounds corresponding to the formula:

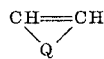

wherein:
a. Q is a fragment which comprises a sequence of at least six carbon atoms situated in linear succession between the methylidene carbons which constitute the double bond;
b. the carbon atoms in the linear succession of Q may be interconnected by both carbon-carbon single bonds and carbon-carbon double bonds;
c. any of the carbon atoms in the linear succession of Q may be substituted by at least one member from the group of alkyl, aryl, alkenyl, aralkyl, alkaryl, cycloalkyl, cycloalkenyl, bicycloalkyl and bicycloalkenyl radicals;
d. any of said carbon atoms in the linear succession of Q may be constituents of aromatic rings, alicyclic rings and chlorinated alicyclic rings; and
e. said alicyclic unsaturated hydrocarbon contains no conjugated double bonds; and 2. alicyclic compounds corresponding to the formula:

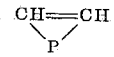

wherein:
a. P is a fragment which comprises a sequence of at least two and not more than three carbon atoms situated in linear succession between the methylidene carbons which constitute the double bonds;
b. the carbon atoms in linear succession of P are connected by carbon-to-carbon single bonds;
c. any of the carbons in the linear succession of P may be substituted by at least one substituent member from the group of alkyl, aryl, alkenyl, aralkyl, alkaryl, cycloalkyl, cycloalkenyl, bicycloalkyl and bicycloalkenyl radicals;
d. any of said carbons in linear succession of P may be constituents of aromatic rings, alicyclic rings and chlorinated alicyclic rings; and
e. said alicyclic unsaturated hydrocarbon compound contains no conjugated double bonds, is exposed to a catalyst capable of inducing ring-opening polymerization and olefin metathesis reaction, said catalyst which will convert 2-pentene into 2-butene and 3-hexene at temperatures lower than about 100°C., leading to interpolymeric products containing [—Q—CH=CH ]$_x$ and/ or [ —P—CH=CH— ]$_y$ repeat units.

2. The process of claim 1 wherein the polymeric substance is an [ethylene-propylenediene] terpolymer, the unsaturated reactant is an alicyclic compound selected from the group of cyclobutene, cyclopentene, cyclooctene, cyclododecene, 1,5-cyclooctadiene, 1,5,9-cyclododecatriene, 3-methylcyclooctene, 3-phenylcyclooctene, 1-methyl-1,5-cyclooctadiene, 1,2-dimethyl-1,5-cyclooctadiene and 1-chloro-1,5-cyclooctadiene and in which the catalyst is a mixture of A. a compound selected from the group of organometallic compounds, organoaluminum halides, and an aluminum halide, and, B. a salt or coordination compound of the transition materials selected from the group of tungsten and molybdenum, in which the molar relationship between the catalyst components is within a molar ratio of A/B of about 0.5/1 to about 8/1.

3. The process of claim 1 wherein the polymeric substance is an [ethylene-propylene] terpolymer, the unsaturated reactant is an alicyclic compound member of the group of cyclobutene, cyclopentene, cyclooctene, cyclododecene, 1,5-cyclooctadiene, 1,5,9-cyclododecatriene, 3-methylcyclooctene, 3-phenylcyclooctene, 1-methyl-1,5-cyclooctadiene, 1,2-dimethyl-1,5-cyclooctadiene, 1-ethyl-1,5-cyclooctadiene and 1-chloro-1,5-cyclooctadiene and the catalyst is a mixture of
  A. at least one organometallic compound wherein the metal is selected from the group consisting of Ia, IIa, IIb, and IIIa of the Periodic Table of Elements, Handbook of Chemistry and Physics, 44th Edition, Chemical Rubber Publishing Company, Cleveland, Ohio, Page 448, and,
  B. at least one metal derivative wherein the metal is selected from the group consisting of tungsten and molybdenum, and,
  C. at least one compound of the general formula R-Y-H wherein Y is selected from the group of oxygen and sulfur and wherein R is a radical selected from the group consisting of (1) hydrogen, (2) alkyl, (3) aryl, (4) arylalkyl, (5) alkaryl, (6) alkenyl, (7) when Y is S, R is thioalkyl, thioarylalkyl and thioalkaryl, (8) when Y is O, R is alkoxy, arylalkoxy and alkaryloxy and radicals of (2) through (6) wherein at least one hydrogen is substituted by a group selected from hydroxyl (OH) and thiol (SH),
in which the molar relationship among the catalyst components is within a molar ratio of B/C ranging from about 0.3/1 to about 20/1 and the molar ratio of A/B is within the range of about 0.5/1 to about 15/1.

4. The process of claim 1 wherein the unsaturated reactant is an alicyclic compound member of the group: cyclobutene, cyclopentene, cyclooctene, cyclododecene, 1,5-cyclooctadiene, 1,5-9-cyclododecatriene, 3-methylcyclooctene, 3-phenylcyclooctene, 1-methyl-1,5-cyclooctadiene, 1,2-dimethyl-1,5-cyclooctadiene, 1-ethyl-1,5-cyclooctadiene and 1-chloro-1,5-cyclooctadiene and said process is conducted in the presence of an unsaturated acyclic compound member of the group consisting of:
  A. aliphatic terminal olefins and
  B. aliphatic internal olefins.

5. The process of claim 1 wherein the polymeric substance is an [ethylene-propylene-1,4-hexadiene] terpolymer, [ethylene-propylene-dicyclopentadiene] terpolymer, [ethylene-propylene-ethylidene bicycloheptene] terpolymer or [ethylene-propylene-1,5-cyclooctadiene] terpolymer and the unsaturated alicyclic compound is cyclopentene, cyclooctene, 1,5-cyclooctadiene, cyclododecene, or 1,5,9-cyclododecatriene.

6. As compositions of matter, the polymers produced by the process of claim 5.

* * * * *